United States Patent [19]

Williams

[11] Patent Number: 4,743,655

[45] Date of Patent: May 10, 1988

[54] NARROW MOLECULAR WEIGHT POLYESTER OLIGOMERS AND METHOD OF PREPARATION

[75] Inventor: Roy C. Williams, Orchard Park, N.Y.

[73] Assignee: NL Chemicals, Inc., New York, N.Y.

[21] Appl. No.: 41,045

[22] Filed: Apr. 20, 1987

Related U.S. Application Data

[63] Continuation-in-part of Ser. No. 854,105, Apr. 21, 1986, Pat. No. 4,659,778.

[51] Int. Cl.$^4$ .................. C08F 8/00; C08L 67/00; C08G 63/12
[52] U.S. Cl. .................................... 525/172; 524/601; 525/165; 528/272; 528/296
[58] Field of Search ............... 525/165, 172; 524/601; 528/272, 296

[56] References Cited

U.S. PATENT DOCUMENTS

| | | | |
|---|---|---|---|
| 2,779,783 | 1/1957 | Hayes | 260/485 |
| 2,895,946 | 7/1959 | Huffman | 528/296 |
| 3,089,863 | 5/1963 | Hicks et al. | 260/75 |
| 3,234,249 | 2/1966 | Brack | 260/407 |
| 3,268,483 | 8/1966 | Klootwijk et al. | 260/75 |
| 3,277,035 | 10/1966 | Vegter et al. | 260/22 |
| 3,332,898 | 7/1967 | Kloos | 260/22 |
| 3,374,208 | 3/1968 | Seiner et al. | 260/78.4 |
| 3,376,272 | 4/1968 | Masters et al. | 260/78.4 |
| 3,376,273 | 4/1968 | Masters et al. | 260/78.4 |
| 3,857,817 | 12/1974 | Henshaw et al. | 260/67.6 |
| 3,867,480 | 2/1975 | Fujiyoshi et al. | 525/172 |
| 3,928,420 | 12/1975 | Fang | 260/475 |
| 3,956,210 | 5/1976 | Leary et al. | 260/21 |
| 3,994,851 | 11/1976 | Chang | 260/29.4 |
| 4,028,309 | 6/1977 | Fang | 260/77.5 |
| 4,045,391 | 8/1977 | Buschfeld | 260/22 |
| 4,104,240 | 8/1978 | Buter | 260/39 |
| 4,171,423 | 10/1979 | Smith et al. | 528/289 |
| 4,264,751 | 4/1981 | Scheibelhoffer | 525/437 |
| 4,314,918 | 2/1982 | Birkmeyer et al. | 260/20 |
| 4,322,508 | 3/1982 | Peng et al. | 525/110 |
| 4,418,182 | 11/1983 | Chattha | 525/438 |
| 4,459,401 | 7/1984 | Sekmakas et al. | 528/296 |
| 4,518,746 | 5/1985 | Sekmakas et al. | 525/443 |
| 4,540,771 | 9/1985 | Ambrose et al. | 528/272 |

FOREIGN PATENT DOCUMENTS

1528802  10/1978  United Kingdom .

OTHER PUBLICATIONS

Paul J. Flory, "Random Reorganization of Molecular Weight Distribution in Linear Condensation Polymers", (Sep. 1942).

Krister Holmberg and Jan-Allan Johansson, "High Solids Alkyd Resins", pp. 23–34, (Date unknown).

*Primary Examiner*—Lucille M. Phynes
*Attorney, Agent, or Firm*—Michael L. Dunn

[57] ABSTRACT

A polyester composition having an average molecular weight of greater than 450 comprising a most prevalent compound having a main polyester chain containing at least 17 and fewer than 52 carbon atoms and at least 6 and fewer than 18 oxygen atoms, at least 40 weight percent of the molecules of said composition having a molecular weight within 50% of the average molecular weight of the composition. The polyester composition desirably contains at least 1.6 equivalents of unreacted hydroxy groups or at least 1.6 equivalents of unreacted carboxy groups per mole. The composition contains at least four equivalents of ester links in the main chains of the molecules per mole.

The composition of the present invention is obtained by the method of the invention wherein alternating series of reactions are each driven essentially to completion where the final molecule of each reaction provides the only available reaction site for the next alternate monomer reaction. The reactions used are the reaction of an anhydride with a hydroxyl to give an ester and a carboxyl group and the reaction of an oxirane group with a carboxyl to give an ester and a hydroxyl group. To start the alternating reaction sequence either a polyol (to react with anhydride) or a polycarboxylic acid (to react with an oxirane) is used.

6 Claims, No Drawings

NARROW MOLECULAR WEIGHT POLYESTER OLIGOMERS AND METHOD OF PREPARATION

This is a continuation-in-part of copending patent application Ser. No. 854,105 filed Apr. 21, 1986 and issuing as U.S. Pat. No. 4,659,778 on Apr. 21, 1987.

BACKGROUND OF THE INVENTION

1. Field of the Invention

This invention relates to polyester resins used in high solids coatings and more particularly relates to such a resin having a relatively low viscosity at high solids concentration. The invention further relates to the method of manufacturing such a resin.

2. History of the Prior Art

Low molecular weight polyesters have been widely used in high solids coatings as a binder which will give low volatile organic compounds (VOC) contents when crosslinked with melamine (or urea) formaldehyde resins or isocyanate functional resins. One of the impediments to getting lower volatiles with these polyesters by further reduction in molecular weight and less solvent (VOC) demand for viscosity reduction is their molecular weight distribution. This problem is discussed in U.S. Pat. No. 4,045,391. As very low molecular weights (500 to 1500 Wn) are approached, the random nature of the polyesterification reaction leaves proportionally larger amounts of the glycols, polyols and polyacids and their simple esters in the final reaction product. These have sufficient volatility to contribute to the VOCs when tested. Also the higher molecular weight portion of the distribution contributes much more heavily to the viscosity and resultant solvent demand of the polyester.

Such polyesters made from oxirane-anhydride single step bulk polymerizations are known in the prior art. Examples of patents describing such polymerizations are U.S. Pat. Nos. 3,376,272; 3,089,863; 2,779,783 and 3,374,208.

Narrowed molecular weight ranges have, however, been difficult to obtain due to random chain length formation in bulk polymerizations and since the temperatures usually associated with esterification reactions cause transesterification and equilibrium reactions.

It has been known that low molecular weight short chain products could be obtained by stepwise reaction of oxiranes and anhydrides with respectively carboxy or hydroxy terminated compounds. Most of such products usually have 20 or fewer combined carbon and oxygen atoms in a single main chain. Such products which have more than 20 combined carbon and oxygen atoms are still not as good as desired when used as prepolymers due to undesirable properties, e.g. an undesirably high percentage of volatile components, formation of soft polymers, formation of polymers having a poor combination of hardness and flexibility, or a viscosity lower than desired. In addition, undesirably large amounts of crosslinking agents may be required to form a suitable polymer from the prepolymer. Numerous patents describe such low molecular weight, short chain products, including U.S. Pat. Nos. 3,857,817 and 4,322,508.

U.S. Pat. No. 4,045,391 is directed toward the preparation of low viscosity polyesters containing fatty acid constituents having a narrowed molecular weight by certain stepwise anhydride-oxirane reactions. The compounds and methods of this patent are not, however, very desirable since the compounds require the presence of ester side chains which generally reduce weatherability and chemical resistance and increase color. In addition such side chains are commonly long and cause undesirable resin softness and may reduce reactivity do to hindrance.

BRIEF DESCRIPTION OF THE INVENTION

In accordance with the present invention there is provided a polyester composition having an average molecular weight of greater than 450 and usually greater than 500 comprising a most prevalent compound having a main polyester chain containing at least 17 and fewer than 52 carbon atoms and at least 6 and fewer than 18 oxygen atoms, at least 40 and usually at least 52 weight percent of the molecules of said composition having a molecular weight within 50 percent of the average molecular weight of the composition, less than 50 and usually less than 40 weight percent of the molecules of the composition having a molecular weight greater than 150 percent of the average molecular weight and less than 15 and usually less than 8 weight percent of the molecules of the composition having a molecular weight less than 50 percent of the average molecular weight of the composition. The polyester composition desirably contains at least 1.6 equivalents of unreacted hydroxy groups or at least 1.6 equivalents of unreacted carboxy groups per mole. The composition contains at least four equivalents of ester links in the main chains of the molecules per mole. When the average molecular weight is below 620, the main chains of the molecules usually pass through at least two equivalents of aromatic groups or branched groups per mole of composition. Each unhalogenated side group of the polyester contains no more than six carbon atoms and desirably no more than one oxygen atom and each halogenated side group contains no more than nine carbon atoms. The most preferred compositions have side groups of six carbon atoms or less whether or not the side groups are halogenated. At least 80% of the molecules of the polyester composition of the invention contain at least four ester groups in the main chain.

The very narrow molecular weight distribution of the composition of the present invention is obtained by an alternating series of reactions each driven essentially to completion where the final molecule of each reaction provides the only available reaction site for the next alternate monomer reaction. These reactions proceed at low temperatures relative to esterification to avoid transesterification side reactions which would widen the molecular weight distribution. At least two practical low temperature reaction types are available to give the alternating sequence desired, i.e. the reaction of an anhydride with a hydroxyl to give an ester and a carboxyl group and the reaction of an oxirane group with a carboxyl to give an ester and a hydroxyl group. To start the alternating reaction sequence either a polyol (to react with anhydride) or a polycarboxylic acid (to react with an oxirane) can be used.

More specifically, the invention includes a method for manufacturing the composition of the invention which method comprises the steps of:

(a) essentially completely reacting a compound A with a compound B;

(b) essentially completely reacting the reaction product of step (a) with a compound C; and (c) repeating step (b) as often as required to obtain the desired main chain length, molecular weight and properties, substituting the reaction product from the previous step (b) for the reaction product of step (a).

A is a diol or triol of from 2 to 10 carbon atoms or a dicarboxylic or tricarboxylic acid of from 4 to 10 carbon atoms. B is an anhydride of up to 10 carbon atoms or an oxirane of up to 10 carbon atoms, provided that when A is a diol or triol, B is an anhydride and when A is a carboxylic acid, B is an oxirane. C is an anhydride of up to 10 carbon atoms or an oxirane of up to 10 carbon atoms provided that when the reaction product of the previous step is hydroxy terminated, C is an anhydride and when the reaction product of the previous step is carboxy terminated, C is an oxirane. "As often as required" in (c) means repeating (b) 0 to 6 times and stopping when the desired properties are obtained.

DETAILED DESCRIPTION OF THE INVENTION

"Average molecular weight" as used herein means number average molecular weight unless otherwise indicated. Average molecular weight is abbreviated $W_n$.

"Equivalents" means equivalent weight.

"Mole" as applied to the compositions of the invention is calculated on the basis of number average molecular weight or theoretical molecular weight.

"Main chain" means the chain of a molecule which contains the largest number of atoms, when the molecule is trifunctionally terminated the atoms in all chains to the terminal functionalities would be considered.

"Aromatic groups" as used in connection with inclusion in a main chain includes the moieties

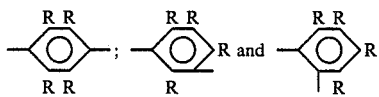

wherein R is a side group.

"Side group" means a group which may or may not have a terminal functional group and does not form part of the main chain, which is connected to an atom in the main chain. The most common side groups are hydrogen, halogen, lower alkyl and halogenated lower alkyl. Side groups may be interconnected to form cyclic structures with atoms of the main chain, e.g. aromatic groups as previously described.

"Lower alkyl" means alkyl of one to nine carbon atoms.

"Polydispersity" is the weight average molecular weight divided by the number average molecular weight. Polydispersity is an indication of the breadth of molecular weight distribution. Generally, the lower the polydispersity, the narrower the molecular weight range.

The most prevalent compound in the compositions of the present invention usually has a molecular weight within 25% of the average molecular weight of the composition and has the structural formula:

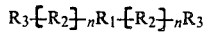

$R_1$ is independently at each occurrence, a carbon terminated group to which may be attached an additional $[R_2]_n R_3$ series;

$R_2$ is independently at each occurrence

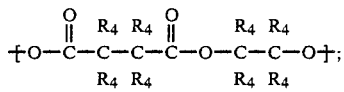

$R_3$ is —H;

$R_4$ is a hydrogen or a pendant group of up to 6 carbon atoms; provided that two $R_4$ groups on adjacent carbon atoms may be combined to form a cyclic structure and further provided that $R_4$ may be up to 9 carbon atoms when $R_4$ is haloalkyl;

n is independently at each occurrence an integer of 1 to 4. It is to be understood that $R_2$ can be attached to the compound by either end, depending upon the group to which it is attached. The compound contains at least 4 ester links in the main chain.

The compositions of the present invention are particularly suitable as crosslinking agents, prepolymers and intermediates for reaction with polyfunctional compounds to form long chain or crosslinked polymeric structures. The carboxy terminated compositions of the present invention can, for example, be reacted with oxiranes or polyols to form long chain polyesters; with phenol formaldehyde, urea formaldehyde or melamine formaldehyde resins to form thermoset plastics; and with epoxies to form crosslinked expoxy resins. The hydroxy terminated compositions of the invention can, for example, be reacted with anhydrides or carboxylic acids to form long chain polyesters; with urea formaldehyde and melamine formaldehyde resins; and with polyisocyanates to form polyurethane resins.

The compositions of the present invention are especially desirable because they have a low solvent demand because of their narrow molecular weight range. The compositions are thus excellent for use in curable type coatings, e.g. polyester based baking enamels. The low solvent demand is desirable for at least two reasons, i.e. it avoids solvent waste and it reduces pollution problems. In addition, the compositions of the present invention have a low solvent demand while avoiding the presence of a large percentage of volatile low molecular weight molecules in the composition.

The compositions of the present invention have an average molecular weight greater than 450, usually greater than 500 and often greater than 620. It has been found that compositions having lower molecular weights are not as suitable for the manufacture of resins. The lower molecular weight compositions usually result in polymers which are not as tough as desired, i.e. they do not have a good combination of hardness and flexibility. In accordance with the present invention, in order to obtain sufficient toughness, compositions having a molecular weight between 450 and 620 desirably contain molecules whose main chains pass through at least 1.2 and usually two aromatic rings or branch chains. Or, stated otherwise, the composition should contain at least 1.2 equivalents of aromatic rings or branches, i.e. tertiary carbon atoms in the main chains per mole of composition. This goal is usually met by using phthalic anhydride or trimellitic anhydride as at least one of the reactants in preparing the composition. When branching is used, e.g. by means of trimellitic anhydride, at least 5% of the molecules contain at least one side branch.

The side groups of the composition of the present invention are restricted to short chain groups, i.e. no more than nine carbon atoms in length and usually no more than six carbon atoms in length. When side chains of over six carbon atoms are used, the groups are usually halogenated for improving flame retardance. Long side chains are generally undesirable since they do not improve and often decrease the structural performance of the composition, increase viscosity thus increasing solvent demand and may hinder reactivity. Side groups may be combined with each other to form cyclic structures in conjunction with atoms in the main chain.

In general, the method of the present invention used to prepare compounds of the present invention comprises the following steps:

(a) essentially completely reacting a compound A with a compound B;

(b) essentially completely reacting the reaction product of step (a) with a compound C; and (c) repeating step (b) as often as required to obtain the desired main chain length, molecular weight and properties, substituting the reaction product from the previous step (b) for the reaction product of step (a).

A is a diol or triol of from 2 to 10 carbon atoms or a dicarboxylic or tricarboxylic acid of from 4 to 10 carbon atoms. B is an anhydride of up to 10 carbon atoms or an oxirane of up to 10 carbon atoms, provided that when A is a diol or a triol, B is an anhydride and when A is a carboxylic acid, B is an oxirane. C is an anhydride of up to 10 carbon atoms or an oxirane of up to 10 carbon atoms provided that when the reaction product of the previous step is hydroxy terminated, C is an anhydride and when the reaction product of the previous step is carboxy terminated, C is an oxirane.

Examples of suitable di- or trifunctional compounds which may be used as compound A, i.e. as the initiator, are ethylene glycol, propylene glycol, 1,4-butanediol; 1,6-hexanediol; 1,8-octanediol; neopentyl glycol; 1-3 butanediol; 2,2,4-trimethyl-1,3-pentanediol; water; maleic acid; succinic acid; malonic acid; adipic acid; azelaic acid; sebasic acid; phthalic acid; isophthalic acid; terephthalic acid; hexahydrophthalic acid; tetrahydrophthalic acid; glycerine; trimethylolpropane; trimethylolethane; pentaerythritol; cyclo-hexane dimethanol; ditrimethylol propane; dipropylene glycol; and trimellitic acid. It is to be understood that compound A may itself contain one or more ester groups and may be prepared by reaction of a polyhydroxy, polycarboxy, polyhydroxy-carboxy containing compound with an oxirane or anhydride to form a polyfunctional hydroxy compound or a polyfunctional carboxy compound. Examples of suitable polyhydroxy-carboxy compounds are hydroxy propionic acid, malic acid, citric acid and dimethylol propionic acid.

Examples of suitable difunctional compounds which may be used as compounds B or C are the anhydrides maleic anhydride; succinic anhydride; phthalic anhydride; tetrahydrophthalic anhydride; hexahydrophthalic anhydride; butane succinic anhydride; trimellitic anhydride; glutaric anhydride; itaconic anhydride; chlorendic anhydride; methyl hexahydrophthalic anhydride; and methyl tetrahydrophthalic anhydride; and the oxiranes, e.g. ethylene oxide; propylene oxide; butylene oxide; cyclohexene oxide; styrene oxide; butyl glycidyl ether; glycidyl acrylate; glycidyl methacrylate; and glycidyl ether. Phthalic anhydride and propylene oxide are especially suitable for use in accordance with the present invention.

In carrying out the reaction, between one and two moles of compound B are reacted with compound A and usually two moles of compound B are reacted with compound A in step (a). Similarly, between one and two and preferably two moles of compound C are reacted with one mole of the reaction product of step (a) or (b). Preferably the number of moles of B which are reacted per mole of A is the same as the functionality of A.

The reaction in all steps is usually carried out below 200° C., preferably below 180° C. and most preferably below 150° C. to avoid side reactions which increases the molecular weight dispersion.

In general, the compositions of the invention are prepared by alternate stepwise additions using 2 to 8 steps and preferably 3 to 7 steps. There is usually no cooling between steps. Each step usually requires a reaction time of from 1 to 5 hours with anhydride additions commonly taking from 1 to 2 hours and oxirane additions commonly taking more than 4 hours. The toala process time is desirably less than 20 hours.

In the oxirane addition steps, where oxirane is added to the polycarboxylic acid (2-3 carboxy groups), the oxirane is added in increments. A catalyst is frequently used in this step to increase reaction speed and reduce reaction temperature. Preferred catalysts are tetramethyl ammonium bromide and triphenyl phosphine. Such catalysts are generally added in an amount of from 0.1 to 1 weight percent. Although usually not preferred, other catalysts such as dimethylethanolamine may be used. This step may be carried out at any pressure from atmospheric to greater than 20 Kg/cm$^2$.

In the anhydride addition step wherein anhydride is added to a polyol (2-3 hydroxy groups), the anhydride may either be added in increments or all at once. Catalysts are usually not required for the anhydride addition step but may optionally be used.

The number of atoms in the carbon oxygen continuous chain between the hydrogens of the terminal functional groups (hydroxyl or carboxyl) are counted and used to define the polyester chain length. Thus, all anhydride additions to the chain would usually contribute four carbons and an oxygen since all common cyclic anhydrides have a five-membered ring. An exception is glutaric anhydride with a six-membered ring, but it is rarely used and expensive. All oxirane additions would contribute two carbons and an oxygen to the continuous chain, since their three-membered ring is composed of two carbons and an oxygen. Generally, the energy released by the ring opening is used to drive each addition step to completion.

All atoms pendant to the continuous chain would not be counted in the chain length. The molecular weight of the polyester molecule would be composed of the continuous chain and all pendant atoms including the terminal hydrogens of the functional hydroxyls. The molecular weight of the oligomer or polyester would vary according to the amount and nature of the pendant groups. An example of a reaction in accordance with the present invention, having a cyclic pendant group, is described below wherein a mole of phthalic anhydride and a mole of propylene oxide are added to a polyester oligomer chain.

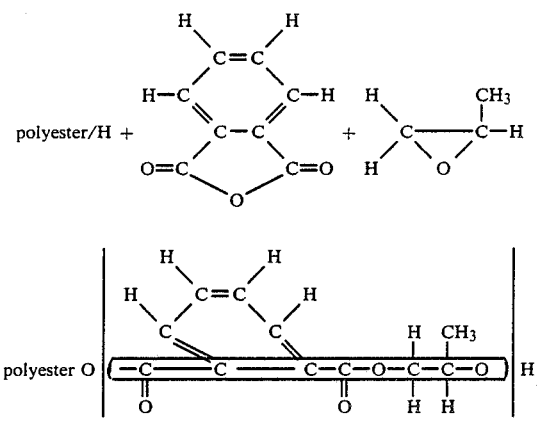

Thus, the encircled continuous chain in the above addition would include the two carbonyl carbons and the two in-between carbon atoms which are part of the benzenoid ring as well as the ether oxygen of the anhydride. Also included would be the two ring carbons of the propylene oxide as well as the oxirane oxygen. The pendant atoms that would not be included in the main chain would therefore be the remaining carbons of the phthalic anhydride benzoid ring and their attached hydrogens as well as the three hydrogens and methyl group of the propylene oxide. In cases such as this, where the pendant four remaining carbons from the benzoid ring of the phthalic anhydride ring are attached to the continuous chain in two different places, the shortest chain path (2 carbons) shall be the continuous main chain of definition. Thus, this scheme can be used to describe a variety of oxirane and anhydride functional reactants.

A step in the described reactions to prepare the polyester represents the addition of at least one and preferably two or more moles of anhydride or, alternatively, at least one and preferably two or more moles of oxirane to the already-formed polyester oligomer. The moles of reactant thus added would be two or more, depending correspondingly on whether the initiating species had a functionality of two or more. If some alternate way was found to incorporate an additional terminated group a carboxyl or hydroxyl to the chain such as through the reaction of trimellitic (anhydride) or glycidol (oxirane), then the reactant moles of the subsequent step of anhydride or oxirane would be correspondingly increased. One would thus add a reactive hydroxyl or carboxyl functional branch to the polyester oligomer. When such branching is used to improve the properties of the product, at least 5% and desirably at least 10% of the molecules contain at least one side chain branch resulting from a trifunctional reactant, e.g. trimellitic anhydride, residue. In such a case with reactive branched oligomers, the longest continuous chain would define the composition for our purposes. The finished composition would almost always have a functionality of at least 1.6 and usually at least 1.8.

An initiating species for the subsequent steps in the reaction is a reactant having two or more reactive hydroxyl or carboxyl groups capable of reacting with oxiranes or anhydrides. Thus, an initiator with two reactive groups would give a resultant linear polyester oligomer. Three groups would lead to an oligomer with one branch and four groups to two branches, etc. If water were to be used as an initiating species with an anhydride, it would be considered to have a mono-functional hydroxyl.

The polyester oligomers are prepared by addition to an initiating species of a series of alternating oxirane and anhydride (or vice versa) steps reacted essentially to completion, i.e. at least 70% and preferably at least 90% completely reacted, such that the final polyester oligomers would have essentially identical molecular species or a molecular weight distribution substantially narrowed. Substantially narrowed is in comparison to a polyester oligomer composition derived by the process wherein, the same reactant amounts are all mixed together at once and subjected to esterification conditions.

On a linear polyester oligomer the addition of an anhydride and an alternate subsequent oxirane step (one mole of each on each side of the initiating species) would increase the chain length twelve carbons and four oxygens (6 and 2 on each side).

The minimum chain length shall be defined as containing at least seventeen carbon atoms and six oxygens between the hydrogens of the two reactive functionalities (hydroxyl or carboxyl). The actual molecular weight of such an oligomer would range upward from 450 and usually 500 depending upon the size of the pendant groups.

The maximum chain length shall be defined as having no more than 52 carbon atoms and 18 oxygen atoms (7 or 8 steps) in the continuous chain. The preferred maximum would be 45 carbons and 14 oxygens, representing about six steps in the reaction.

In general, oligomers below the minimum chain length have too high a functional content (hydroxyl or carboxyl) and require too much crosslinking resin content (hexamethyoxymethylol melamine resin, etc.) to react them completely into the crosslinked polymer network to produce the best film properties. Inferior properties such as brittleness may also result from the crosslinked sites being too closely spaced together in the network. One may note that the lower limit on chain length and molecular weight is higher than that which would be calculated for specific examples in such patents as Henshaw U.S. Pat. No. 3,857,817, e.g., one mole of propylene glycol plus 2 moles of succinic anhydride plus a subsequent stepwise two moles of propylene oxide or also one mole of azelaic acid plus 2 moles of propylene oxide. It is also higher than the examples in Peng U.S. Pat. No. 4,322,508 showing one mole of trimethylol propane (TMP) plus three moles of phthalic anhydride plus three moles of propylene oxide added stepwise. While one may increase the molecular weight and thus lower the functionality of such short continuous chain oligomers with a high proportion of bulky pendant groups such as greater than six carbon species this produces crosslinked polymer networks of recognized inferior properties in the hardness/flexibility balance and durability.

For the upper chain length limit on our claims one encounters a diminishing return with increased length on the lowered viscosity and resultant VOC in coatings of such oligomers made with our disclosures. Also at the upper limit the reactive functionality is lower for the linear species and the resultant crosslink density of the polymer becomes lower than desired unless reactive functionality containing side chains are introduced. Such side chain content tends to increase viscosity disproportionately, however, with reduced VOC advantages for the oligomer.

The number of carbon atoms in a chain pendant group shall usually be limited to six whether such pendant group is connected to the continuous chain in only one place (carbon atom) or in more than one place (two different carbon atoms). The pendant groups may originate with either the anhydride or oxirane reactant. Also ester or amide groups and more than one ether oxygen should not be included in the six carbon or less radical such that the chemical resistance would be lowered and the resultant increased molecular weight would cause decreased crosslink density such as in the comparison of alkyd resin properties with polyester resin properties. Thus, butylene oxide, styrene oxide or cyclohexene oxide could be acceptable oxirane reactants whereas $C_{8-10}$ olefin oxide or epoxidized fatty acids or branched monocarboxylic acids having a carbon number of 10–15 (e.g. Cardura E TM) would not. Alternately, in the anhydride source reactants such as phthalic anhydride, hexahydrophthalic anhydride would be acceptable whereas dodecenyl succinic anhydride and maleinized fatty acids would not, and would contribute to an inferior hardness/flexibility balance. Preferably, the pendant groups should contain four or less carbons but this may unduly restrict the choice of reactants available to the practitioner capable of giving traditional thermoset polyester coating performance. However, it should be recognized that some pendant groups such as the four aromatic carbons from a phthalic anhydride contribute beneficial properties such as hardness and rigidity to the polyester chain as they are attached in two places. Reactants containing more than six pendant, e.g. nine, carbons may be introduced if it is the purpose to introduce some special performance feature to the polyester, such as flame retardancy with chlorendic anhydride.

The initiating species can be water, a polyhydroxy functional molecule, a polycarboxylic acid, or a molecule containing more than one of both carboxyl or hydroxyl functionality. The limitation on the initiator would be that it should not be so high in molecular weight as to unduly change the polyester nature of the oligomer. For example, the use of dimer acids (C-32) in a short chain oligomer would give it an unduly high aliphatic content or a polyethylene glycol initiator would give diminished chemical resistance and increased water sensitivity. The initiator should preferably contain no more than 10 carbon atoms in the main chain. Also a polyester as initiator would undesirably increase the molecular weight distribution contrary to the teachings of the present invention.

The initiator may also be composed of a mixture of two or more molecules, particularly if it is derived to modify properties or introduce branching in the middle of the chain. For example, a mixture of neopentyl glycol and TMP could be used. However, if the mixture is too diverse, the molecular weight distribution may be undesirably increased.

The method of the present invention has several significant advantages. In particular, the reactions permit the use of lower temperatures which avoids undesirable esterification and transesterification reactions which undesirably increase the molecular weight distribution which in turn would either increase the volatiles or increase the solvent demand of the resulting product. Such side reactions are especially prevalent in the prior art methods employing proton or Lewis acid type catalysts.

In addition, each step can be driven to completion thus obtaining a high conversion rate. The ability to select the number of steps and step components generally permits selection of the most prevalent compound in the end product and permits excellent control of molecular weight. Furthermore, hydroxycarboxy functionality of the end product can be precisely controlled.

A reaction scheme showing five steps in a method in accordance with the present invention is as follows:

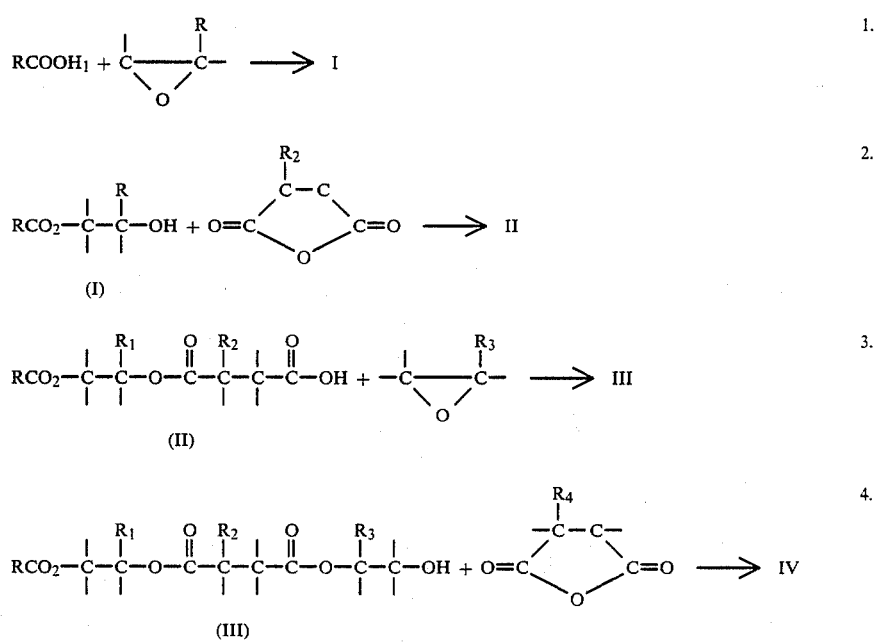

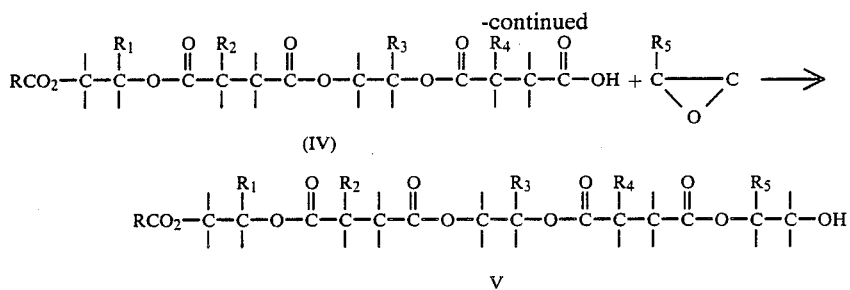

The following examples serve to illustrate and not limit the present invention. Unless otherwise indicated, all parts and percentages are by weight.

A control white thermosetting enamel paint formula was used to test films from some of the various oligomers described in the examples. VOC contributions from the various oligomers were calculated theoretically based on determined NVs ASTM D2369 and determined by ASTM method 3690 for paint VOCs.
1. $TiO_2$—120 grams
2. Oligomer 100%—105 grams
3. Solvent of above—Amount determines VOC
4. Hexamethoxy methylol melamines—45 grams
5. 40% p-toloene sulfonic acid—1.1 grams
6. Reducing Solvent*—As needed to spray 45 sec.—Amount determines VOC

*Reducing Solvent: 50% methyl ethyl ketone, 50% 3-ethoxy propionic acid ethyl ester (EEP) available under the trademark Ektapro EEP.

% of product within molecular weight ranges were determined by gel permeation chromatography. Reactions were conducted in an inert atmosphere of nitrogen to avoid oxidative side reactions.

EXAMPLE A

A terminal hydroxyl functional propylene succinate propylene phthalate, 1,6-hexanediol phthalate propylene succinate propylene oligomer abbreviated HO(PO-SA-PO-PA-1,6-HD-PA-SO-SA-PO)OH was prepared in four steps as follows. The chain length according to definition would be 30 carbons and 10 oxygens with a molecular weight of 846.

To a 3-liter flask were added 139 grams (2.2 moles) of 1,6-hexane-diol and 355 grams (2.4 moles) of phthalic anhydride; the diphthalic half-ester was formed at 285° F. over a 2-hour period to an acid value of 266 determined in 20% water and 80% dimethylformamide. To this was added 4.5 grams of trimethyl ammonium bromide (TMAB) and 154 grams (2.4 moles) of propylene oxide over a 4-hour period at 250° F. to an acid value of seven. To this was then added 242 grams or 2.4 moles of succinic anhydride over 1½ hours at 285° F. to form the half-ester. To this was then added 4.5 grams of TMAB and 2.4 moles of propylene oxide over a 4-hour period at 250° F. to an acid value of 9. This oligomer mixture was then thinned with 105 grams of isobutyl isobutyrate to an oligomer concentration of about 92% and a viscosity of 138 stokes.

In comparison a theoretically-identical oligomer composition was prepared by conventional esterification with propylene glycol substituted on a molar basis for the propylene oxide as below:

Into a five-liter flask was charged 514 grams (4.30 moles) of 1,6-hexanediol, 1290 grams of phthalic anhydride (8.72 moles), 662 grams (8.72 moles) of propylene glycol, 872 grams (8.72 moles) of succinic anhydride, and 662 grams (8.72 moles) of additional propylene glycol. Esterification was conducted at 450° F. with a packed column to retain the propylene glycol over an 8-hour period during which 327 grams (18.2 moles) of water were removed to an acid value of 3. To this was added 398 grams of EEP solvent (ethoxy n-propionic acid ethyl ester) to an oligomer concentration of 90%. The acid value was 3 and the viscosity was 185 stokes. When cut in isobutyl isobutyrate (IBIB) to the same 90% oligomer concentration, the viscosity is 192 stokes with 89% determined NV.

The oligomer solution was tested in a control white thermosetting enamel as previously described. The VOC was calculated to be 2.3 pounds/gallon. When baked 20 minutes at 350° F., the 60° gloss was 97 units and a 1.5 mil film gave a 4H pencil hardness with 120 in-lbs direct impact.

Properties were determined for the stepwise vs. the unicharge preparations as follows:

| Property | Stepwise | Unicharge |
| --- | --- | --- |
| Polydispersity | 1.26 | 1.69 |
| Preferred $W_n$ Range | | |
| +50% 1269 $W_n$ | 26% above | 53.3% above |
| −50% 423 $W_n$ | 5% below | 7.7% below |
| Wt % within range | 69% | 39.0% |

EXAMPLE B

A terminal hydroxy functional propylene phthalate propylene succinate propylene adipate propylene succinate propylene phthalate propylene oligomer abbreviated HO(PO-PA-PO-SA-PO-AA-PO-SA-PO-PA-PO)OH was prepared in five steps as follows. The chain length would be 39 carbons and 12 oxygens and the molecular weight 990.

In a three-liter flask was charged 219 grams (1.5 moles) of adipic acid and 14.5 grams of tetramethyl ammonium bromide (TMAB) catalyst. To this was added 174 grams (3 moles) of propylene oxide at reflux over a period of three hours at 285° F. to an acid value of 2. To this was added 300 grams (3 moles) of succinic anhydride to form the di-half ester at 250° C. for 1½ hours to an acid value (in 20% $H_2O$ 80% DMF) of 227. To this was then added 174 grams (3 moles) of propylene oxide at reflux at 250° F. over 2½ hours to an acid value of 7. To this was then added 444 grams (3 moles) of phthalic anhydride at 260° F. for four hours to an acid value of 137 N,N-dimethyl formamide (DMF). To this was then added 174 grams (3 moles) of propylene oxide at 270° F. and the mixture was refluxed over a 2½ hour period until an acid value of 4 was reached. 1225 grams of this oligomer was then reduced with 136 grams of EEP to an oligomer content of 90% and a viscosity of 79 stokes.

For comparison, a theoretically compositionally identical oligomer was prepared by conventional esterification procedures with propylene glycol substituted for propylene oxide on a molar basis as below:

Into a five-liter flask was charged all together 2.43 times each of the following ingredients: 219 grams (1.5 moles) of adipic acid; 228 grams (3 moles) of propylene glycol; 300 grams (3 moles) of succinic anhydride; 228 grams (3 moles) of propylene glycol; 444 grams (3 moles) of phthalic anhydride; and 228 grams (3 moles) of propylene glycol. This was esterified at 460° F. for 9 hours under a packed column until an acid value of 5. This was then reduced to 90% oligomer content with EEP with a viscosity of 300 stokes. It can be noted that this viscosity is almost three and a half times that of the oligomer prepared by the process of the invention in the same solvent at the same oligomer content.

The stepwise oligomer was tested in the control paint formula and gave a calculated VOC of 2.3 lbs/gal. and a determined ASTM 3960 VOC of 2.66. When baked at 350° F. for 20 minutes, 1.5 mil films gave a 60° gloss of 96% and 2H pencil hardness with 80 in-lbs direct impact resistance.

| Property | Stepwise | Unicharge |
|---|---|---|
| Polydispersity | 1.55 | 1.81 |
| Preferred $W_n$ Range | | |
| +50% 1483 $W_n$ | 16.9% above | 50.0% above |
| −50% 495 $W_n$ | 6.2% below | 9.5% below |
| Wt % within range | 76.9% | 41.5% |

EXAMPLE C

A terminal dihydroxy functional propylene mixed succinate phthalate 1,6-hexane mixed succinate phthalate propylene polyester oligomer abbreviated HO(PO.-SA/PA.1,6-HD.SA/PA.PO)OH was prepared in five steps as follows. The chain length of the theoretical oligomer would be 18 carbons and 6 oxygens and the molecular weight would be 520.

To a five-liter flask was charged 708 grams of 1,6-hexanediol (6 moles), 1598 grams (10.8 moles) of phthalic anhydride and 120 grams (1.2 moles) of succinic anhydride. This was held at a temperature of 270° F. for about two hours to an acid value of 264 in DMF. To this was then added 15.6 grams of triphenyl phosphine catalyst and 697 grams (12 moles) of propylene oxide under reflux over a period of five hours to an acid value of 13. An additional 12 grams of propylene oxide was added to replace losses from the condenser at 270° F. for an hour to further reduce the acid value to nine. To 2903 grams of this was added 153 grams of EEP solvent with a 95% oligomer concentration with a viscosity of 121 stokes and a hydroxyl value of 189 and a determined non-volatile of 93.4%.

As a comparison, a theoretically-identical oligomer composition (except for molecular weight distribution) was prepared by conventional polyesterification techniques. Propylene glycol is substituted on a molar basis for the propylene oxide.

The following ingredients were all charged together to a five-liter flask with a packed column: 974 grams (8.25 moles) of 1,6 hexanediol, 2200 grams (14.9 moles) of phthalic anhydride, and 1255 grams (16.5 moles)S of propylene glycol. These were esterified under reflux at 420° F. for eleven hours to an acid value of six, evolving 300 grams (16.5 moles). Ninety-five grams of this oligomer was reduced with 5 grams of EEP solvent to an oligomer content of 95%, a viscosity of 190 stokes, a determined NV of 89.6%, and a hydroxyl value of about 198. When compared to the above oligomer of our disclosed procedures, the lower determined NV (89.6 versus 93.4%) indicates considerably more lower molecular weight species and the higher viscosity D(190 stokes versus 121 stokes) considerably more higher molecular weight species for the conventionally-prepared polyester and thus a narrower molecular weight distribution with the disclosed procedures.

When the stepwise oligomer was tested in the control paint, a calculated VOC of 2.1 lb/gal was obtained and a determined (ASTM 3960) VOC of 2.3 was obtained. When baked 20 minutes at 350° F. 1.5 mil paint films had a 60° gloss of 79 and a 2H pencil hardness with a 40 in-lbs direct impact result.

| Property | Stepwise | Unicharge |
|---|---|---|
| Polydispersity | 1.17 | 1.45 |
| Preferred $W_n$ Range | | |
| +50% 780 $W_n$ | 16.7% above | 54.4% above |
| −50% 260 $W_n$ | 3.0% below | 4.3% below |
| Wt % within desired range | 70.3% | 43.3% |

EXAMPLE D

A terminal hydroxy-functional propylene mixed succinate phthalate propylene, mixed succinate phthalate, dipropylene glycol, mixed succinate phthalate, propylene mixed succinate phthalate, propylene polyester oligomer abbreviated

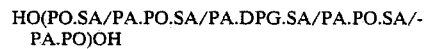
HO(PO.SA/PA.PO.SA/PA.DPG.SA/PA.PO.SA/-PA.PO)OH was prepared in four steps as follows. The oligomer chain length would be 28 carbons and 8 oxygens and the theoretical molecular weight 862.

To a three-liter flask was charged 268 grams (2 moles) of dipropylene glycol, 200 grams (2 moles) of succinic anhydride and 296 grams (2 moles) of phthalic anhydride. This was reacted at 260° F. for 2½ hours to an acid value of 293 (in DMF). To this was added seventeen grams of trimethyl ammonium bromide catalyst and 232 grams (4 moles) of propylene oxide under reflux over a period of six hours at about 250° F. to an acid value of six. To this was then added 200 grams (2 moles) of succinic anhydride and 296 grams (2 moles) of phthalic anhydride and this was reacted at 285° F. to an acid value of 153 (in H₂O.DMF) over a period of three hours. To this was added 232 grams (4 moles) of propylene oxide under reflux at about 250° F. over a period of five hours to an acid value of five.

Nine hundred grams of this oligomer was then reduced with a hundred grams of EEP solvent to a viscosity of 138, hydroxyl value of 105 and a determined VOC of 89%.

As a comparison, a theoretically identical oligomer composition (except for molecular weight distribution) was prepared by conventional polyesterification techniques. Propylene glycol was substituted on a molar basis for the propylene oxide. To a five-liter flask with a packed column the following were charged all together: 536 grams (4 moles) of dipropylene glycol; 800 grams (8 moles) of succinic acid; 1184 grams (8 moles) of phthalic anhydride; and 1216 grams (16 moles) of propylene glycol. This was reacted under reflux at 450°

F. for seven hours evolving 270 grams of water to an acid value of 6. To 900 grams of this oligomer 100 grams of EEP solvent was added for a viscosity of 262 stokes and a hydroxyl value of 103. It may be noted that the viscosity is twice that of the oligomer prepared by the methods of the present invention.

The stepwise oligomer, when tested in the control paint, gave a determined (ASTM 3960) VOC of 2.35 lb/gal. When baked at 350° F. for 20 minutes, the 60° gloss was 97% for 1.5 mil films with 3H pencil hardness and 60 inch/lbs direct impact resistance. In contrast, the unicharge oligomer gave a 2.72 lb/gal determined VOC (ASTM 3960) with essentially the same film qualities.

Molecular weight distribution properties are as follows:

| Property | Stepwise | Unicharge |
|---|---|---|
| Polydispersity | 1.28 | 1.64 |
| Preferred $W_n$ Range | | |
| +50% 1293 $W_n$ | 22.1% above | 44.5% above |
| −50% 431 $W_n$ | 7.5% below | 9.0% below |
| Wt % within range | 70.4% | 46.5% |

EXAMPLE E

A terminal hydroxy functional propylene mixed phthalate succinate, dipropylene glycol, mixed phthalate succinate, propylene polyester oligomer, abbreviated:

HO(PO.PA/SA.DPG.PA/SA.PO)OH was prepared in two steps as follows. The chain length of the oligomers is 16 carbons and seven oxygens and the theoretical molecular weight would be 498.

To a three-liter flask was charged 469 grams (3.5 moles) of dipropylene glycol, 350 grams (3.5 moles) of succinic anhydride and 518 grams (3.5 moles) of phthalic anhydride and reacted at 280° F. for 1½ hours to an acid value of 309 in DMF. To this was added 17 grams of trimethyl ammonium bromide catalyst and 407 grams of propylene oxide under reflux at 260° F. for 8 hours to an acid value of seven. To 940 grams of the resultant oligomer was added 50 grams of IBIB solvent for a viscosity of 51 stokes and a determined NV of 92%.

For comparison a theoretically identical oligomer composition (except for molecular weight distribution) was prepared by conventional polyesterification techniques. Propylene glycol was substituted on a molar basis for the propylene oxide. To a three-liter flask equipped with a packed column condenser was charged 402 grams (3 moles) of dipropylene glycol; 300 grams (3 moles) of succinic anhydride; 444 grams (3 moles) of phthalic anhydride; and 456 grams (6 moles) of propylene glycol. This was reacted at reflux at 450° F. for five hours to an acid value of six evolving 103 grams of water. To 94 grams of oligomer was added six grams of IBIB solvent for a viscosity of 43 stokes and a determined NV of 87%. While the viscosity is not higher than the oligomer of the process of our disclosure, probably due to the large amount of low molecular weight fractions, the lower determined NV (87% versus 92%) indicates the large amounts of these low molecular weight fractions which are detrimental to determined VOCs on the resultant paints.

When tested in the control paint, the stepwise oligomer gave a calculated VOC of 2.0 lbs/gal whereas the unicharge oligomer gave a calculated VOC of 2.4 lbs/gal.

| Property | Stepwise | Unicharge |
|---|---|---|
| Polydispersity | 1.20 | 1.51 |
| Preferred $W_n$ Range | | |
| +50% 747 $W_n$ | 23.8% above | 48.7% above |
| −50% 249 $W_n$ | 3.0% below | 4.5% below |
| Wt % within desired range | 73.2% | 46.7% |

EXAMPLE F

A hydroxyl-terminated propylene mixed succinate phthalate propylene adipate propylene mixed phthalate succinate propylene polyester oligomer, abbreviated HO(PO.PA/SA.PO.AA.PO.PA/SA.PO)OH, was prepared as follows. The chain length would be 22 carbons and 8 oxygens and the theoretical molecular weight would be 664.

To a five-liter flaks with reflux condenser was charged 879 grams (6.02 moles) of adipic acid, 698 grams (12.04 moles) (with 10% excess to allow for losses through condenser) of propylene oxide and 20 grams of triphenyl phosphine catalyst. This was reacted (with a gradual addition of the propylene oxide) at reflux and 270° F. for a period of 3 hours to an acid value of one and the excess propylene oxide sparged off with inert gas. To this was then added 1604 grams (10.84 moles) of phthalic anhydride and 120 grams (1.20 moles) of succinic anhydride which was reacted at 270° F. for 1½ hours to an acid value 158 (in DMF). This product was in turn reacted with 698 grams (12 moles) of propylene oxide under reflux for three hours to an acid value of 7 and a hydroxyl value of 155. Nine hundred and 50 grams of the resulting oligomer was reduced with 50 grams of EEP solvent to a viscosity of 213 stokes.

For a comparison, a theoretically identical composition polyester oligomer was prepared using conventional unicharge esterification procedures. Propylene glycol replaced the propylene oxide on a molar basis.

To a five-liter flask with packed column condenser was charged all together 879 grams (6.02 moles) of adipic acid, 1830 grams (24 moles) of propylene glycol, 1604 grams of phthalic anhydride (10.8 moles) and 120 grams of succinic anhydride (1.2 moles). These were reacted at 450° F. under reflux for 7 hours to an acid value of 10 and a hydroxyl value of 150. When 950 grams of this oligomer was reduced with 50 grams of EEP solvent, the viscosity was 404 stokes about twice that of the oligomer prepared with our disclosures.

As a further example the final propylene oxide reaction step of the stepwise oligomer above was modified with ethylene oxide replacing the propylene oxide on a molar basis. The chain length of this oligomer is the same as that of the stepwise propylene oxide oligomer but the molecular weight is reduced to 636. The ethylene oxide was introduced gradually under a pressure of 50 psi, at 250° F. until an acid value of 1.4. was obtained.

When 950 grams of this oligomer was reduced with 50 grams of EEP solvent, the viscosity was 129 stokes.

A control paint was prepared from the stepwise propylene oxide oligomer according to the procedures described above and a calculated VOC of 2.1 lbs/gal and a determined VOC of 2.3 lbs/gal was obtained. A 60° gloss of 90% with an H pencil hardness and 160 inch-lbs of impact resistance from 1.5 mil films baked at 15 minutes at 300° F.

When the unicharge oligomer was prepared in the same paint, a calculated VOC of 2.3 lbs/gal and a determined VOC (ASTM 3960) of 2.7 lbs/gal was obtained.

| Property | Stepwise | Unicharge |
|---|---|---|
| Polydispersity | 1.25 | 1.55 |
| Preferred $W_n$ Range | | |
| +50% 1008 $W_n$ | 18.2% above | 46.5% above |
| −50% 332 $W_n$ | 7.5% below | 10.2% below |
| Wt % within range | 74.3% | 43.3% |

EXAMPLE G

The following theoretical linear polyester oligomer was prepared in eight steps according to our disclosed procedure as below:

A terminal hydroxy-functional propylene, succinate, propylene, succinate, propylene, pthalate, propylene, succinate, 1,6-hexanediol, succinate, propylene, phthalate, propylene, succinate, propylene, succinate, propylene polyester oligomer, abbreviated:

HO(PO.SA.PO.SA.PO.PA.PO.SA.1,6-HD.SA.PO.-PA.PO.SA.PO.SA.PO)OH was prepared in eight steps as follows. The chain length is 44 carbons and 16 oxygens and the theoretical molecular weight if 1478.

To a five-liter flask were charged 558 grams (4.73 moles) of 1,6-hexanediol and 946 grams (9.46 moles) of succinic anhydride. This was reacted to the di-half ester at 250° F. to an acid value of 356 (in DMF). To this was added 20 grams of triphenyl phosphine, 548 grams (9.46 moles) of propylene oxide at reflux at 270° F. over two hours to an acid value of six. To this was added 1400 grams (9.46 moles) of phthalic anhydride and reacted at 275° F. for two hours to 173 acid value (DMF) to form the di-half ester. To this in turn was added 548 grams (9.46 moles) of propylene oxide to an acid value of 4 under reflux at 265° F. over a four-hour period. At this stage, 2000 grams of oligomer (2.36 moles) were transferred to another five-liter flask and the reaction continued by the addition of 473 grams (4.73 moles) of succinic anhydride, which was reacted to the di-half ester at 280° F. in 1½ hours to 103 acid value in DMF. To this was added 7.5 grams of triphenyl phosphine and 274 grams (4.73 moles) of propylene oxide under reflux at 270° F. over a 3-hour period to an acid value of seven. To this was in turn charged 473 grams (4.73 moles) of succinic anhydride and the di-half ester formed at 280° F. to an acid value of 76 (in DMF). To this was added 274 grams (4.73 moles) of propylene oxide over a four-hour period at reflux at 265° F. to an acid value of one. Nine hundred grams of the resultant oligomer was reduced with 100 grams of EEP solvent to 231 stokes viscosity with a determined NV of 89.5%.

For comparison, a theoretically identical oligomer composition (except for the molecular weight distribution) was prepared by conventional polyesterification techniques. Propylene glycol was substituted on a molar basis for the propylene oxide. To a five-liter flask with a packed column was charged all together 305 grams (2.58 moles) of 1.6-hexanediol; 1553 grams (15.53 moles) of succinic anhydride; 1574 grams (20.71 moles) of propylene glycol; and 767 grams (5.18 moles) of phthalic anhydride. This was reacted at 440° F. under reflux for 12 hours to an acid value of 2 evolving 363 grams of water. To 900 grams of this oligomer were added 100 grams of EEP solvent to 90% oligomer concentration and a viscosity of 586 with a determined NV of 89.4%. It can be noted that this viscosity is approximately twice that of the oligomer prepared with the disclosure of the invention.

When tested in the control paint, the stepwise oligomer had a calculated VOC of 2.5 lbs/gal in contrast to a calculated VOC of 2.8 for the unicharge oligomer. The pencil hardness and flexibility of these films were approximately equal (H and 160 in/lbs impact).

| Property | Stepwise |
|---|---|
| Polydispersity | 1.64 |
| Preferred $W_n$ Range | |
| +50% 2214 $W_n$ | 42.1% above |
| −50% 738 $W_n$ | 9.8% below |
| Wt % within desired range | 48.1% |

EXAMPLE H

A terminal hydroxy functional propylene, phthalate, propylene, phthalate, propylene, succinate, 1,6-hexandiol, propylene, succinate, propylene, phthalate, propylene, phthalate, propylene polyester oligomer, abbreviated

HO(PO.PA.PO.PA.PO.SA.1,6-HD.SA.PO.PA.PO.-PA.PO)OH, was prepared in six steps as follows. The chain length is 32 carbons and 12 oxygens and the molecular weight is 1258.

To a five-liter flask was added 2000 grams (2.37 moles) of the oligomer formed in the first four steps of Example G. The reaction is continued with 700 grams of phthalic anhydride reacted to the di-half ester at 290° F. for an hour and a half to an acid value of 103 (in pyridine). To this was added 274 grams of propylene oxide under reflux over a period of 3½ hours to an acid value of 6 and a hydroxyl value of 83. When 850 grams of this oligomer are reduced with 150 grams of EEP solvent to an 85% oligomer concentration the viscosity is 149 with a determined NV of 89.5%

For a comparison a theoretically identical oligomer composition (except for molecular weight distribution) was prepared by conventional polyesterification techniques. Propylene glycol was substituted on a molar basis for the propylene oxide. To a five-liter flask with a packed column condenser was added all together 346 grams (2.93 moles) of 1-6 hexanediol; 586 grams (5.86 moles) of succinic anhydride; 1336 grams (17.57 moles) of propylene glycol; and 1743 grams (11.71 moles) of phthalic anhydride. This, with 27 grams of propylene glycol to replace losses, was esterified under reflux at 450° F. for 12 hours at an acid value of 4 and a hydroxyl value of 70. When 850 grams of this oligomer were reduced with 150 grams of EEP solvent to 85% oligomer content, a viscosity of 366 stokes with an 84.5% determined NV resulted. This is more than the viscosity of the oligomer obtained by the procedures of these disclosures.

A second conventionally prepared polyester was prepared as described above except that the total amount of propylene glycol was increased by 137 grams (1.82 moles). The final acid value was 3 and the viscosity was 140 stokes when reduced to 85% oligomer content with EEP as above. The polydispersity was 1.81. This conventional polyester showed a shift in the GPC molecular weight distribution downward such that it had a decrease in the amount above the theoretical $W_n+50\%$ of 46.9% to 26% and an increase in the amount below the theoretical $W_n-50\%$ of 16.7% to 30%. This shows that compositional changes will not improve the conventionally prepared polyester to that of our disclosure. If the molecular weight is lowered, more volatiles will occur than in a product prepared in accordance with the invention. If the molecular weight is raised, the viscosity and more long chain material will occur than in a product prepared in accordance with the invention.

| Property | Stepwise | Unicharge | Propylene Glycol Excess Unicharge |
|---|---|---|---|
| Polydispersity Preferred $W_n$ Range | 1.19 | 1.87 | 1.81 |
| +50% 1887 $W_n$ | 24% above | 46.9% above | 26% above |
| −50% 629 $W_n$ | 5% below | 16.7% below | 30% below |
| Wt % within range | 71% | 34.4% | 44% |

EXAMPLE I

In this example, an oligomer is prepared by the method described in Example 2 of U.S. Pat. No. 4,045,391.

To a three-liter flask, 111.4 grams (0.94 mole) of 1,6-hexanediol and 279.2 grams (1.89 moles) of phthalic anhydride were charged and reacted at 300° F. for two hours to an acid value of 276 in DMF. To this was then added 462 grams (1.89 moles) of $C_{13}$ carboxylic acid glycidal ester (Cardura E ®, Shell) and reacted at 300° F. for three hours to an acid value of 9.5. To this in turn was added 279 grams of phthalic anhydride which was reacted at 300° F. for 1½ hours to an acid value of 64 (DMF). To this was added 468 grams of ethylene glycol (large excess) and the acid value reduced to 10 over a six-hour period at 380° F. The excess ethylene glycol was distilled off under vacuum at 375° F. for four hours.

Ninety grams of this oligomer was reduced with 10 grams of butyl acetate to a viscosity of 29 stokes, a determined NV of 87% and a hydroxyl value of 150. As the theoretical hydroxyl value is 78, one would conclude that the distillation of the ethylene glycol is an inefficient method of preparing the desired product subject to possible transesterification complications.

EXAMPLE J

In this example, an oligomer is prepared by the method disclosed in Example 5 of U.S. Pat. No. 4,045,391 except that ethylene oxide is replaced on a molar basis by propylene oxide for convenience in preparation.

For a three-liter flask equipped with condenser was charged 127 grams (0.87 mole) of adipic acid and 427 grams (1.74 moles) of $C_{13}$ carboxylic acid glycidal ester (Cardura E ®). This was reacted at 310° F. for four hours to an acid value of 14. To this was added 258 grams (1.74 moles) of phthalic anhydride and the mixture reacted at 300±F. for two hours to an acid value of 125 (in DMF). To this in turn was added 427 grams (1.74 moles) of Cardura E ® and the mixture reacted at 310° F. to an acid value of 13 over 2½ hours. To this in turn was charged 258 grams of phthalic anhydride (1.74 moles) and this was reacted to 94 acid value (DMF) over 2 hours. To this in turn was added 101 grams (1.74 moles) of propylene oxide at 300° F. under reflux over a five-hour period to a 32 acid value and a 57 hydroxyl value. Ninety grams of this was reduced with 10 grams of isobutyl isobutyrate solvent to a viscosity of 143 and determined NV of 87%.

The oligomer solution was evaluated in the control white paint. A calculated VOC of 2.5 lbs/gal and a determined VOC of 2.8 lbs/gal were obtained. When films were cured with a high bake of 20 minutes at 350° F., only an F pencil hardness was obtained and the coating failed 10 in-lbs reverse impact, indicating a film of low strength.

EXAMPLE K

A trifunctional hydroxy-terminal oligomer was prepared which illustrates a technique for introducting branching into the oligomer. The molecular weight and chain length can be increased by additional anhydride and oxirane steps as described herein.

A tripropylene mixed phthalate succinate trimethylol propane oligomer abbreviated

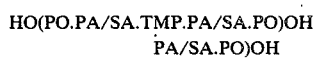

was prepared as follows. The largest chain length would be 15 carbons and 6 oxygens and the theoretical molecular weight would be 707.

The oligomer was prepared by charging 268 grams (2 moles) of TMP, 7 grams of triphenyl phosphine catalyst, and 592 grams (4 moles) of succinic anhydride to a flask with condenser and reacting at 280° F. over a 1½ hour period to an acid value of 304 (DMF). To this was then added 349 grams (6 moles) of propylene oxide under reflux at 275° F. over a period of five hours to an acid value of 9. When 85 grams of this oligomer were reduced with 15 grams of EEP solvent, the viscosity was 237 stokes.

As a comparison, a polyester was prepared by conventional polyesterification techniques in the following manner. To a flask equipped with packed column reflux condenser was added all together 268 grams (2 moles) of TMP; 592 grams (4 moles) of phthalic anhydride; 200 grams (2 moles) of succinic anhydride; and 456 grams (6 moles) of propylene glycol. This was reacted at reflux at 450° F. for 6 hours to an acid value of 8 and a hydroxyl value of 222. When 85 grams of this oligomer were reduced with 15 grams of EEP, a viscosity of 400 stokes were obtained.

EXAMPLE L

A terminal dihydroxy functional propylene phthalate 1-6 hexane phthalate propylene polyester oligomer abbreviated as HO(PO.PA-1,6.HD.PA-PO)OH, was prepared in two steps as follows. The chain length is 18 carbons and six oxygens and the theoretical molecular weight would be 530.

To a five-liter flask with condenser was charged 890 grams (7.54 moles) of 1,6 hexanediol and 2234 grams (15.09 moles) of phthalic anhydride. This was reacted at 285° F. (approx.) for a period of forty minutes to an acid value of 288 in DMF. To this was added 24 grams of triphenyl phosphite at 275° F. and then 876 grams (15.1 moles) of propylene oxide under reflux over a period of five hours to an acid value of 4.3 and a hydroxyl value of 203. Ninety-five grams of this polyester was reduced with 5 grams of EEP solvent to give a viscosity of 98 and a determined NV of 92.2. The polydispersity is determined to be 1.12.

In order to compare a chemically theoretically identical oligomer (except for molecular weight distribution) by conventional polyesterification reaction, the following ingredients were all charged together in a five-liter flask equipped with a packed column condenser. Propylene glycol replaces propylene oxide on a molar basis. This included 890 grams of 1,6 hexanediol (7.54 moles), 2234 grams (15.1 moles) of phthalic anhydride, and 1148 grams (15.1 moles) of propylene glycol which was heated to 425° F. and refluxed while removing water of reaction over a 7½ hour period to an acid value of 5.1 and a hydroxyl value of 206. Ninety-five grams of this polyester were then reduced with five grams of EEP solvent to a viscosity of 334 and a determined NV of 89.5%. The polydispersity was reported as 1.48.

The molecular weight distribution properties are as follows:

| Property | Stepwise | Unicharge |
| --- | --- | --- |
| Polydispersity | 1.12 | 1.48 |
| Preferred $W_n$ Range | | |
| +50% 795 $W_n$ | 15.2% above | 56% above |
| −50% 265 $W_n$ | 1.7% below | 4% below |
| Wt % within range | 83.1% | 40% |

EXAMPLE M

A terminal dihydroxy functional propylene, phthalic, propylene adipate, propylene, phthalate, propylene, polyester oligomer, abbreviated HO(PO.PA.PO.AdA.-PO.PA.PO)OH, was prepared in three steps as follows. The chain length of the theoretical oligomer is 22 carbons and 8 oxygens and the theoretical molecular weight is 672.

To a three-liter flask with reflux condenser was charged 292 grams (2.0 moles) of adipic acid and 5.3 grams of TMAB catalyst. To this was added 232 grams of propylene oxide over a period of 18 hours at 225° F. to an acid value of 3. To this was added 592 grams (4.0 moles) of phthalic anhydride over a period of an hour at 275° F. to an acid value of 205 (DMF). To this was added 232 grams (4.0 moles) of propylene oxide over a period of 3 hours at 250° F. under reflux to an acid value of 7 and a hydroxyl value of 148. Ninety grams of this polyester were reduced with isobutylisobutyrate solvent (IBIB) to an 88.1 determined NV and a viscosity of 75 stokes. The polydispersity was reported as 1.27.

As a comparison, a chemically equivalent theoretically identical oligomer composition (except for Mwt distribution) was prepared by conventional polyesterification technique with propylene glycol replacing propylene oxide on a molar basis.

To a five-liter flask equipped with a packed column condenser was charged all together 585 grams (4.0 moles) of adipic acid, 1216 grams (8.0 moles) of propylene glycol, and 1184 grams (8.0 moles) of phthalic anhydride. This was then heated to 460° F. for 6 hours under reflux to an acid value of nine, removing 132 grams of water. When reduced (95 grams) with five grams of IBIB, the viscosity was 554 stokes and a determined NV of 92.3%. The polydispersity was reported as 1.56.

The molecular weight distribution properties are as follows:

| Property | Stepwise | Unicharge |
| --- | --- | --- |
| Polydispersity | 1.27 | 1.56 |
| Preferred $W_n$ Range | | |
| +50% 1008 $W_n$ | 23.7% above | 49% above |
| −50% 336 $W_n$ | 7.0% below | 9% below |
| Wt % within range | 69.3% | 42% |

EXAMPLE N

A terminal dihydroxy functional ethylene mixed succinate phthalate propylene adipate propylene mixed succinate phthalate ethylene polyester oligomer abbreviated

HO(EtO.SA/PA.PO.AdA.PO.SA/PA.EtO)OH, was prepared in three steps as follows. The chain length of the theoretical oligomer would be 22 carbons and 8 oxygens, and the molecular weight would be 634.

To a five-liter flask equipped with a reflux condenser was added 879 grams of adipic acid and 20 grams of triphenyl phosphine catalyst and heated to 280° F. To this was added 698 grams (12 moles) of propylene oxide over a 6-hour period at 260° F. to an acid value of one. To this was then added 1604 grams (10.8 moles) of phthalic anhydride and 120 grams of succinic anhydride and reacted at 280° F. for two hours to an acid value of 196. To this was added 528 grams (12 moles) of ethylene oxide under 50 psi pressure at 250° F. for 3 hours to an acid value of 1.3 and a hydroxyl value of 167. When 85 parts of this was reduced with five parts of EEP, a viscosity of 129 stokes at a predetermined NV of 94.0 was obtained. The polydispersity was reported at 1.24.

As a comparison, a theoretically and chemically identical polyester oligomer (except for molecular weight distribution) was prepared by conventional polyesterification techniques. Ethylene glycol was used to replace the ethylene oxide and propylene glycol to replace the propylene oxide.

The following materials were all charged together to a five-liter flask equipped with a packed column reflux condenser. This included: 692 grams (4.74 moles) of adipic acid; 720 grams (9.48 moles) of propylene glycol; 1262 grams (8.53 moles) of phthalic anhydride; 95 grams (0.95 mole) of succinic anhydride; and 588 grams of ethylene glycol. This was then heated to 495° F. over a 7-hour period under reflux to a 6.7 acid value and a 167 hydroxyl value. When 95 parts of this was reduced with five parts of EEP, the viscosity was 214 stokes at a determined NV of 93.0%. The polydispersity was reported as 1.56.

The molecular weight distribution properties are as follows:

| Property | Stepwise | Unicharge |
| --- | --- | --- |
| Polydispersity | 1.24 | 1.56 |
| Preferred $W_n$ Range | | |
| +50% 951 $W_n$ | 23.0% above | 47.7% above |
| −50% 317 $W_n$ | 5.8% below | 10.6% below |
| Wt % within range | 71.1% | 41.7% |

A control white thermosetting enamel was prepared for both of the above oligomers. The paint based on the above polyester of our disclosure had a measured VOC of 2.50 lbs/gal as compared to a measured VOC of 2.89 lbs/gal for the paint based on the above conventionally prepared polyester control. The film properties when cured as per Example A were essentially equivalent except for an improved flexibility (100%) for the polyester of our disclosure.

What is claimed is:

1. A polyester composition having an average molecular weight of greater than 450 comprising a most prevalent compound having a main polyester chain containing at least 17 and fewer than 52 carbon atoms and at least 6 and fewer than 18 oxygen atoms, at least 40 weight percent of the molecules of said composition having a molecular weight within 50% of the average molecular weight of the composition; less than 50 weight percent of the molecules of the composition having a molcular weight greater than 150% of the average molecular weight of the composition and less than 15 weight percent of the molecules of the composition having a molecular weight less than 50% of the average molecular weight of the composition, said polyester composition containing at least 1.6 equivalents of unreacted hydroxy groups or at least 1.6 equivalents of unreacted carboxy groups per mole; at least 5% of the molecules containing at least one side chain branch resulting from a trimellitic anhydride residue, and said composition containing at least four equivalents of ester links in the main chains of the molecules per mole of composition, said composition containing side groups selected from hydrogen and halogenated and unhalogenated groups attached to the main chain through a carbon atom, each of said unhalogenated side groups containing no more than six carbon atoms and no more than one oxygen atom and each of said halogenated side groups containing no more than nine carbon atoms.

2. The polyester of claim 1 wherein the average molecular weight is greater than 500.

3. The polyester of claim 2 wherein the main chains of the molecules of such compositions having an average molecular weight of 620 or less, pass through at least 1.2 equivalents of aromatic groups per mole of composition.

4. The polyester composition of claim 1 wherein at least 52 weight percent of the molecules of said composition have a molecular weight of the composition; less than 40 weight percent of the molecules of the composition having a molecular weight greater than 150% of the average molecular weight of the composition and less than 8 weight percent of the molecules of the composition having a molecular weight less than 50% of the average molecular weight of the composition.

5. The polyester of claim 3 wherein the main chains of the molecules of such compositions, having an average molecular weight of 620 or less, pass through at least two equivalents of aromatic groups per mole of composition.

6. A polyester composition having an average molecular weight of greater than 500 comprising a most prevalent compound having a main polyester chain containing at least 17 and fewer than 52 carbon atoms and at least 6 and fewer than 18 oxygen atoms, at least 52 weight percent of the molecules of said composition having a molecular weight within 50% of the average molecular weight of the composition, less than 40 weight percent of the molecules of the composition having a molecular weight greater than 150% of the average molecular weight of the composition and less than 8 weight percent of the molecules of the composition having a molecular weight less than 50% of the average molecular weight of the composition, said polyester composition containing at least 1.6 equivalents of unreacted hydroxy groups or at least 1.6 equivalents of unreacted carboxy groups per mole and said composition containing at least four equivalents of ester links in the main chains of the molecules per mole of composition, said composition containing side groups selected from hydrogen and halogenated and unhalogenated groups attached to the main chain through a carbon atom, each of said unhalogenated side groups containing no more than six carbon atoms and no more than one oxygen atom and each of said halogenated side groups containing no more than nine carbon atoms provided that, the main chains of the molecules of such compositions having an average molecular weight of 620 or less, pass through at least 1.2 equivalents of aromatic groups per mole of composition.

* * * * *